UNITED STATES PATENT OFFICE.

JOHN LIPPINCOTT, OF PITTSBURG, PENNSYLVANIA.

IMPROVEMENT IN THE MANUFACTURE OF SHOVELS AND SPADES.

Specification forming part of Letters Patent No. 32,701, dated July 2, 1861.

*To all whom it may concern:*

Be it known that I, JOHN LIPPINCOTT, of Pittsburg, in the county of Allegheny and State of Pennsylvania, have invented a new and useful Improvement in Shovels and Spades; and I do hereby declare the following to be a full, clear, and exact description thereof.

My improvement consists in making shovels and spades furnished with a coating of tin, as a new article of manufacture.

To enable others skilled in the art to make use of my improvement, I will proceed to describe the method which I employ in manufacturing my tinned shovels and spades.

The ordinary method heretofore practiced of finishing shovels and spades is as follows: After the spade or shovel is made, and before it receives its finish, it has a rough and uneven surface, and is covered with scale. This is removed and a smooth and even surface given to the iron by grinding it on a grindstone. This operation of course removes more or less of the iron, to allow for which the spade or shovel is made heavier than it is designed to be when finished, so that there is a loss of stock or material in this process. After as smooth a surface as possible is given by the grindstone the spade or shovel is polished on an emery-wheel to remove the marks of the grinding and fit it for the market. These operations of grinding and polishing are expensive, and require to be done by a skillful and experienced workman. Spades and shovels thus finished are very apt to rust, so that when transported by land they must be covered up with baling, and when shipped by sea they have to be packed in tarred paper to preserve their polished surface unimpaired. My invention is designed to remove these difficulties by giving to the spade or shovel a fine finish at a great reduction in cost, and to render them proof against rust, so that they may be shipped by sea or land or kept in store by the merchant without danger of becoming damaged.

My method of manufacturing my tinned shovels is as follows: After the shovels or spades are made and ready for polishing in the usual manner, and before the handles are put in, I remove the scale by dipping them in an acid bath, using sulphuric acid diluted with water, which is the ordinary way of removing scale from iron. After the scale is all removed, leaving the clear surface of iron, they are washed in water to remove all trace of the acid, and are then ready for the tinning process. The tinning is effected by dipping them in a bath of melted tin, in which they are allowed to remain a sufficient length of time to become thoroughly coated, after which they are ready for the final polishing. This is done by rubbing the tinned surface with corn-meal, or by passing the tinned shovels or spades over a soft buffing-wheel. The handles are then inserted in the usual way, and they are finished ready for the market.

I am aware that other articles made of iron have been coated with tin—such as saucepans, kettles, &c.—and I do not claim broadly the tinning of iron utensils; but the application of a coating of tin to shovels and spades in lieu of the ordinary finish by polishing is, I believe, entirely new. It is also highly useful as producing a much improved article, and is a great advantage to the manufacturer, as it enables him to effect a saving of material and greatly to reduce the cost of finishing. It is also an advantage to the trade, because shovels and spades thus finished can be kept on hand ready for sale without rusting or tarnishing, as they are apt to do when finished in the ordinary way. A spade or shovel which has become brightened and polished by long use is known to work much better than when new, and my improved article has so smooth a polish that it works as well when new as at any time after use, which is a great advantage, especially where they are used in clay or loamy soil. My improved article also commands a more ready sale on account of its improved appearance.

Having thus described my improvement, what I claim as my invention, and desire to secure by Letters Patent, is—

Making shovels or spades with an exterior coating of tin, as a new article of manufacture.

In testimony whereof I, the said JOHN LIPPINCOTT, have hereunto set my hand.

JOHN LIPPINCOTT.

Witnesses:
MARTIN G. CUSHING,
A. S. NICHOLSON.